April 13, 1965     H. D. SMITH     3,177,610

PACKAGE FOR RODENTICIDES

Filed Oct. 19, 1962

INVENTOR
Herbert D. Smith

BY Cecil L. Wood

ATTORNEY

United States Patent Office 3,177,610
Patented Apr. 13, 1965

3,177,610
PACKAGE FOR RODENTICIDES
Herbert D. Smith, Bonham, Tex., assignor to Hi-Yield Fertilizer Company, Bonham, Tex., a corporation of Texas
Filed Oct. 19, 1962, Ser. No. 231,764
2 Claims. (Cl. 43—131)

This invention relates to a paper box, and it concerns more particularly a paper or cardboard box, formed by folding a single blank, for use as a package for rodenticide and a lure to be used in conjunction therewith.

An object of the invention is to provide a package for use in marketing and dispensing rodenticide in the form of finely divided particles or granules, and a suitable lure or bait in liquid form which, when mixed with said particles or granules, serves to attract rats and mice whereby they are induced to consume the poison and thereby destroyed.

Another object of the invention is to provide a package for the purpose described in which the material which comprises the lure or bait is contained in a sealed plastic envelope which is further enclosed in a separate compartment, apart from the poison particles or granules, until it is used, whereby such material is maintained in fresh and effective condition.

The invention will be readily understood by referring to the following description and the accompanying drawing, in which:

FIGURE 1 is a perspective view of a paper or cardboard box embodying the invention, showing the box in its open position and showing the sealed plastic envelope containing a suitable lure or bait in liquid form supported on a bottom portion of the separate compartment in which it is enclosed, above the bottom of the box, and showing the box below said compartment filled with rodenticide in the form of finely divided particles or granules.

Figure 1:
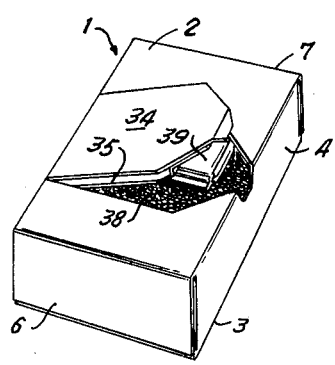
Figure 2:
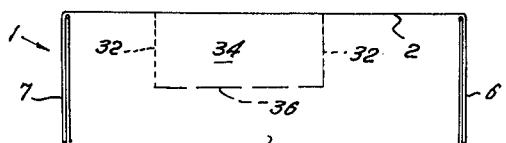
FIGURE 2 is a side elevational view showing the box in its closed position.
Figure 3:
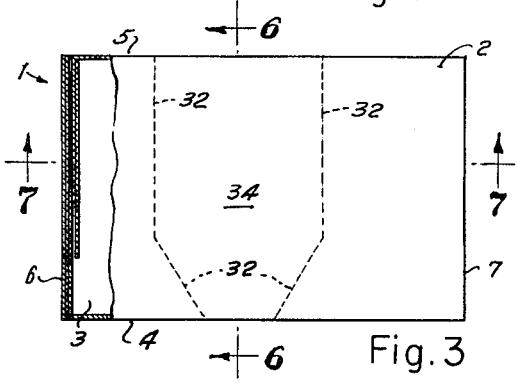
FIGURE 3 is a top plan view thereof, partly broken away to show details of construction.
Figure 5:
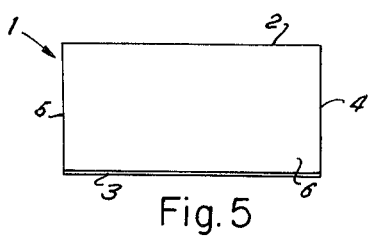
FIGURE 5 is an end elevational view.
Figure 4:
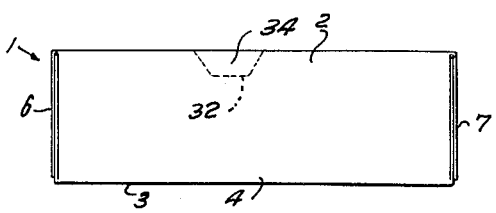
FIGURE 4 is an elevational view showing the side of the box opposite the side shown in FIGURE 2.
Figure 6:
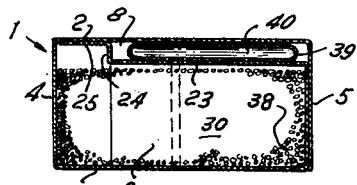
FIGURE 6 is a sectional elevational view taken on the line 6—6 of FIGURE 3, showing the sealed plastic envelope containing a suitable lure or bait in liquid form enclosed within the compartment therefor below the top of the box, and showing the box below said compartment filled with rodenticide in the form of finely divided particles or granules.
Figure 7:
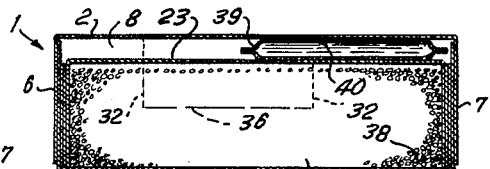
FIGURE 7 is a sectional elevational view taken on the line 7—7 of FIGURE 3.
Figure 8:
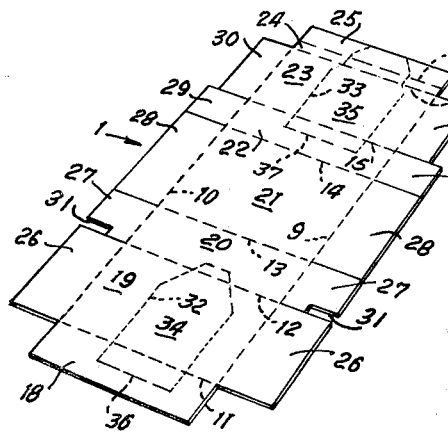
FIGURE 8 is a perspective view showing the blank from which the box is made in its unfolded position.
Figure 9:
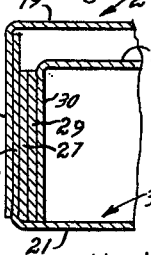
FIGURE 9 is an enlarged fragmentary sectional view of one end of the box embodying the invention, and showing the several layers of end tabs.

Referring to the drawing, the numeral 1 designates a rectangular paper or cardboard box embodying the invention, which is formed by folding a single blank as illustrated in FIGURE 8.

As shown in FIGURES 1 to 7, the box 1 has a top 2, a bottom 3, a front side 4, a back side 5, a left end 6, and a right end 7, and has a separate, relatively shallow compartment 8, coextensive with its length, arranged along its back side 5 immediately below the top 2 thereof, the width of the compartment 8 being relatively less than the width of the box 1.

As shown in FIGURE 8, the blank from which the box 1 is folded has a pair of longitudinally extending fold lines 9, 10, which are spaced inwardly from opposite sides thereof, and which define the longitudinally extending panels, as hereinafter described, which are positioned between the fold lines 9, 10, and the left and right ends, 6, 7 thereof, which comprise portions of the blank 1 which extend laterally outwardly beyond the fold lines 9, 10, respectively, as hereinafter described.

The blank 1 has seven transversely extending fold lines 11, 12, 13, 14, 15, 16, 17, which with the longitudinally extending fold lines 9, 10 define eight longitudinally extending panels, 18, 19, 20, 21, 22, 23, 24, 25. The panels 18, 19, 20, 21 correspond to the back side 5, the top 2, the front side 4 and the bottom 3.

The back side 5 consists of two thicknesses of material, one of which is the panel 22, which are connected by an adhesive. The panel 22 is relatively narrower than the panel 18 and extends upwardly from the bottom 3 to a point below the top 2 which corresponds to the bottom of the compartment 8, which is formed by the panel 23.

The side of the compartment 8 opposite the back side 5 of the box 1 is formed by the panel 24, which extends upwardly from the bottom 23 thereof, in parallel, spaced apart relation to the front side 4 of the box 1, and is connected at its upper edge to the horizontally extending panel 25 which is secured by an adhesive to the top 2 of the box 1.

The left and right ends 6, 7 each consist of five thicknesses of material comprising tabs 26, 27, 28, 29, 30, which are extensions of the longitudinally extending panels 19, 20, 21, 22, and 23, respectively, as shown in FIGURE 8. The height of the tabs 29 corresponds to the width of the panel 22, which extends vertically below the bottom of the compartment 8, as above described, and the tabs 27 are notched as at 31 so that they do not cover the adjacent ends of the compartment 8.

The top 2 and the front and back sides 4, 5 of the box 1, and the panels 23, 24, 25, which comprise the bottom and front side of the compartment 8 are scored along parallel lines to form cut lines 32, 33 defining a pair of mutually aligned tabs 34, 35 extending across the top 2 of the box 1 and downwardly a short distance along the front and back sides 4, 5 thereof, and across the panels 23, 24, 25 which comprise the bottom and front side of the compartment 8. The tabs 34, 35 have fold lines 36, 37 whereby they are adapted to be raised successively to thereby expose the contents of the compartment 8 and of the box 1 below it.

The box 1 below the compartment 8 is filled with rodenticide in the form of finely divided particles or granules 38, and the compartment 8 contains a plastic envelope 39 filled with a suitable lure or bait 40 in liquid form. The arrangement is such that, upon raising the tabs 34, 35 to expose the contents of the compartment 8 and of the box 1 below it, and thereafter slitting the plastic envelope 39, the lure or bait 40 is caused to mix with the particles or granules 38. The bottom 23 of the compartment 8 provides a shelf for conveniently supporting the envelope 39 above the bottom 3 of the box 1 after it has been opened.

The invention may be modified in various ways without departing from the spirit and scope thereof.

What is claimed is:
1. A rectangular cardboard box, formed by folding a single blank, having a top, a bottom, two opposite sides, and two opposite ends, and having a separate, relatively shallow compartment, coextensive with its length, arranged along one side of the box immediately below the top thereof, the width of the compartment being relatively less than the width of the box, and the top and the other side of the box, and the bottom of the compartment and one side thereof corresponding to said other side of the box, arranged in parallel, spaced apart relation thereto, being scored along parallel lines to form cut lines defining a pair of mutually aligned tabs extending across the top of the box and downwardly a short distance along said one side thereof, and across the bottom and said one side of the compartment, said tabs being adapted to be raised successively to thereby expose the contents of the compartment and of the box below it.

2. The structure of claim 1, including a granulated rodenticide in the box below said compartment, a plastic envelope in said compartment and a liquid bait lure in said envelope, the arrangement being such that, upon raising said tabs to expose the contents of said compartment and of the box below it, and thereafter slitting the plastic envelope, said lure is caused to mix with said rodenticide, the bottom of said compartment providing a shelf for conveniently supporting said envelope above the bottom of the box after it has been opened.

References Cited by the Examiner

UNITED STATES PATENTS

| | | | |
|---|---|---|---|
| 584,072 | 6/97 | Church | 229—27 |
| 938,799 | 11/09 | Teasdale | 229—27 |
| 1,086,610 | 2/14 | Nunes | 43—131 |

ABRAHAM G. STONE, *Primary Examiner.*

F. RAY CHAPPELL, *Examiner.*